United States Patent [19]

DeGress et al.

[11] Patent Number: 5,059,055

[45] Date of Patent: Oct. 22, 1991

[54] MECHANICALLY ATTACHED LINER HANGER ASSEMBLY

[75] Inventors: Peter B. DeGress, Jupiter; Kenneth E. Harmon, North Palm Beach, both of Fla.

[73] Assignee: United Technologies Corporaton, Hartford, Conn.

[21] Appl. No.: 600,634

[22] Filed: Oct. 19, 1990

[51] Int. Cl.⁵ .............................................. F16D 1/00
[52] U.S. Cl. ..................................... 403/24; 403/364; 403/407.1
[58] Field of Search ...................... 403/407.1, 364, 24

[56] References Cited

U.S. PATENT DOCUMENTS

| 1,564,715 | 12/1925 | Russell | 403/407.1 |
| 4,407,534 | 10/1983 | Petz | 403/364 X |
| 4,813,809 | 3/1989 | Stratman et al. | 403/407.1 X |

Primary Examiner—Andrew V. Kundrat
Attorney, Agent, or Firm—Christopher T. Hayes

[57] ABSTRACT

The invention discloses a liner hanger assembly which is mechanically attached to the component to which the liner is secured, thereby allowing hanger materials to be selected based on other than weldability considerations, and allowing the hanger to be removed and repaired when worn or damaged.

9 Claims, 3 Drawing Sheets

MECHANICALLY ATTACHED LINER HANGER ASSEMBLY

The invention was made under a U.S. Government contract and the Government has rights herein.

TECHNICAL FIELD

This invention relates to mechanical attachments, and more particularly to hangers for attaching thermal liners to structural components of a nozzle on a gas turbine engine.

BACKGROUND

The use of liners in nozzles on gas turbine engines is well known in the art. Such liners are often secured to the inner surfaces of a nozzle to protect those surfaces from the intense heat of the gas turbine exhaust. The liners, which act as thermal barriers to heat transfer between the exhaust gas and the structural components of the nozzle, are critical to preventing life reduction or failure of the structural components.

In the past, such liners have been attached to their respective surfaces by hanger loops 10, of the type shown in FIGS. 1 and 2. These hanger loops 10 are typically welded to a honeycomb panel structure 11, and therefore must be made of a metal that is weldably compatible with the panel 11 metal. Additionally, the hanger loops 10 of the prior art had to be formed from very thin metal to be able to withstand the variety of thermal gradients which occur along the height 12 of the hanger loop during gas turbine operation.

Due to the hanger loops being so thin, the "legs" 13 of each hanger loop 10 must be attached at an angle or which deviates as little as possible from a perpendicular 14 to the panel structure 11 to minimize stress in the hanger legs 13. Consequently, a hanger loop 10 of the prior art had a relatively narrow opening 15, as shown in FIG. 1, making it difficult to insert a retaining pin through a plurality of hanger loops 10 to secure a liner to the panel structure 11. Despite attempts to design a hanger loop 10 which minimizes thermal stresses, a high percentage of the prior art hanger loops 10 fail during use due to stress and thermal fatigue.

What it is needed is a liner hanger which can withstand the thermal gradients to which liner hangers are exposed, and which provides a relatively large opening for easy insertion of the retaining pin.

DISCLOSURE OF THE INVENTION

It is therefore an object of the present invention to provide a liner hanger which can withstand the thermal gradients to which liner hangers are exposed.

It is further an object of the present invention to provide a liner hanger which does not require weldable compatibility between the hanger material and the structural component to which the hangers are attached.

It is a still further object of the present invention to provide a liner hanger through which the retaining pin may be easily inserted.

According to the present invention, a liner hanger is disclosed which is mechanically attached to the supporting structural component. Each hanger includes a plurality of hanger straps or loops through which a common support rail extends. The rail in turn is attached to the support component by mechanical fasteners, such as bolts, thereby eliminating the need for weldable compatibility between the hanger material and the structural component material.

The hanger straps of the present invention are thermally free to expand independent of the structural component to which they are attached. This characteristic allows the hanger straps to be made of materials which are better able to withstand stress and thermal gradients than those hanger straps of the prior art. Additionally, the wider opening of the hanger straps of the present invention provide a larger working area for insertion of the retaining pin, thereby making such insertion significantly easier.

The foregoing and other features and advantages of the present invention will become more apparent from the following description and accompanying drawings.

BEST MODE FOR CARRYING OUT THE INVENTION

Figure 3:
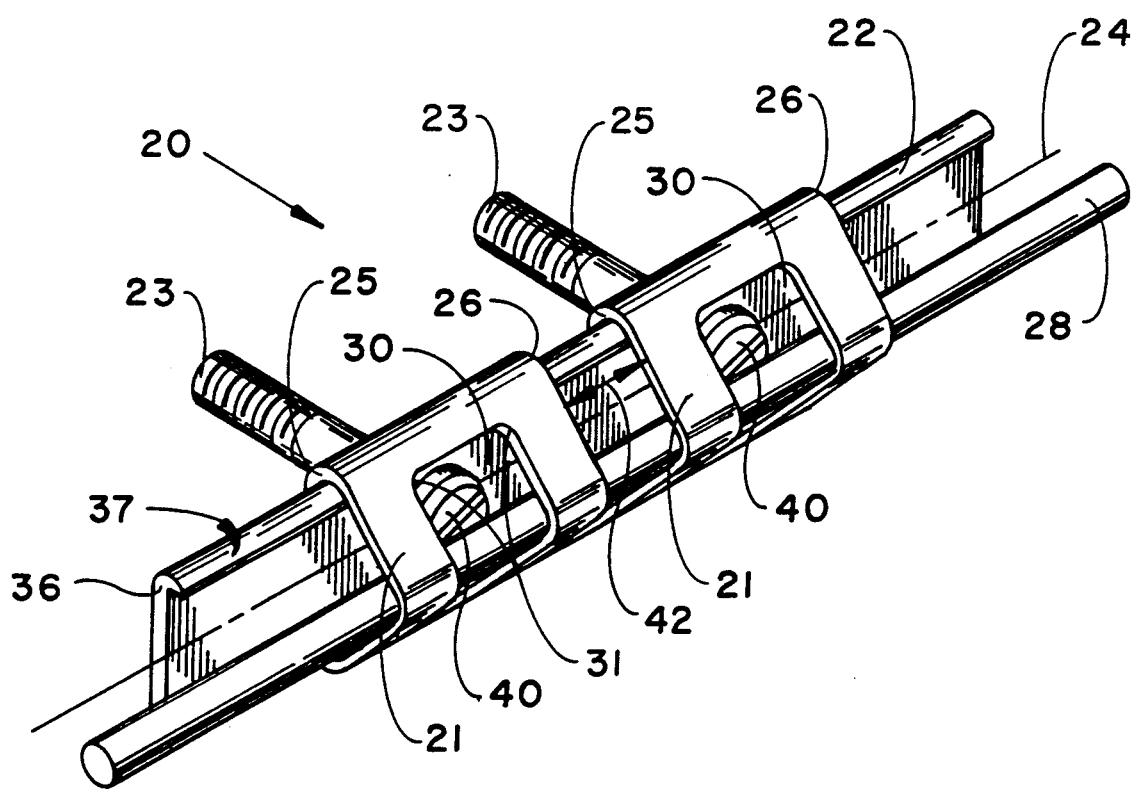
FIG. 3 is a perspective view of the hanger assembly of the present invention.
Figure 5:
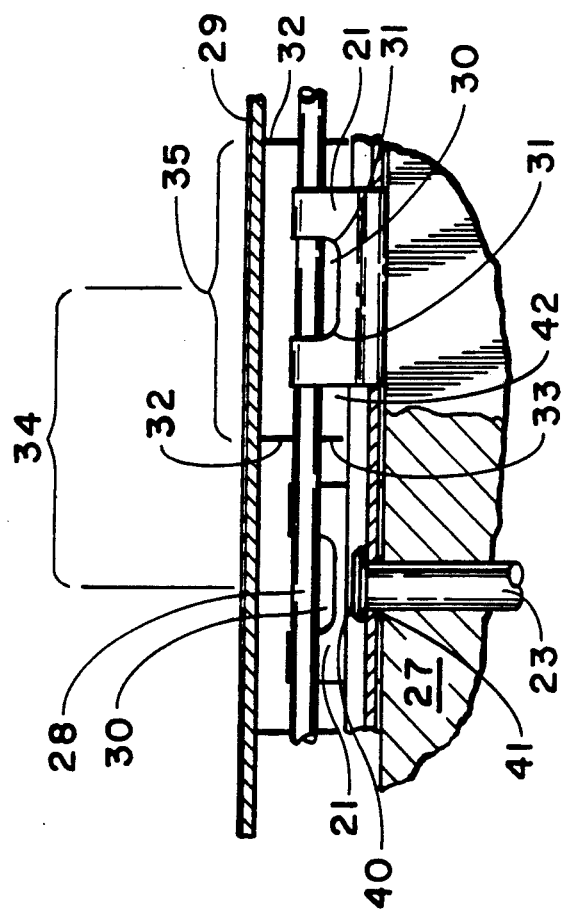
FIG. 5 is a side view, partially cut-away, of the present invention connecting a liner to a structural member.
Figure 4:
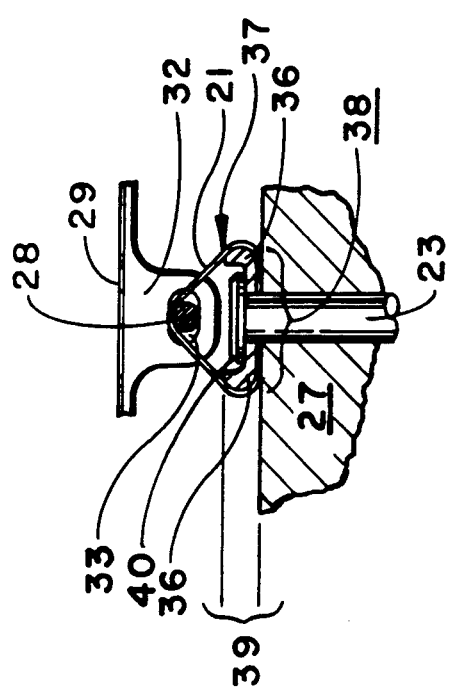
FIG. 4 is an end view of the hanger assembly of the present invention connecting a liner to a structural member.

As shown in FIG. 3, the mechanically attached hanger assembly 20 of the present invention includes a plurality of hanger straps 21 through which a fastening rail 22 extends. The fasteners 23, preferably located along the longitudinal axis 24 of the rail 22 to provide symmetric loading of the rail 22, secure the rail 22 to the structural component 27, as shown in FIGS. 4 and 5. Additionally, each of the fasteners 23 extends through one of the straps 21 at a position equi-distant the longitudinal ends 25, 26 thereof. A retaining pin 28 extends through each of these straps 21, for securing a second member, such as a liner 29, to the structural component 27.

Each of the straps 21 preferably has a cutout 30 to provide access to the fastener 23 to aid in securing the hanger assembly 20 to the structural component 27. The corners 31 of each cutout 30 are rounded to reduce stress concentrations as those skilled in the art will readily appreciate. Each of the straps 21 is in spaced relation to the adjacent straps 21, allowing each strap to thermally expand along the longitudinal axis 24 without interference from adjacent straps 21. Due to the mechanically attached nature of the hanger assembly 20 of the present invention, the choice of strap material is not limited by the weldability considerations discussed above. Strap material can therefore be chosen on the basis of other considerations such as strength, manufacture ability, cost, etc.

Figure 1:
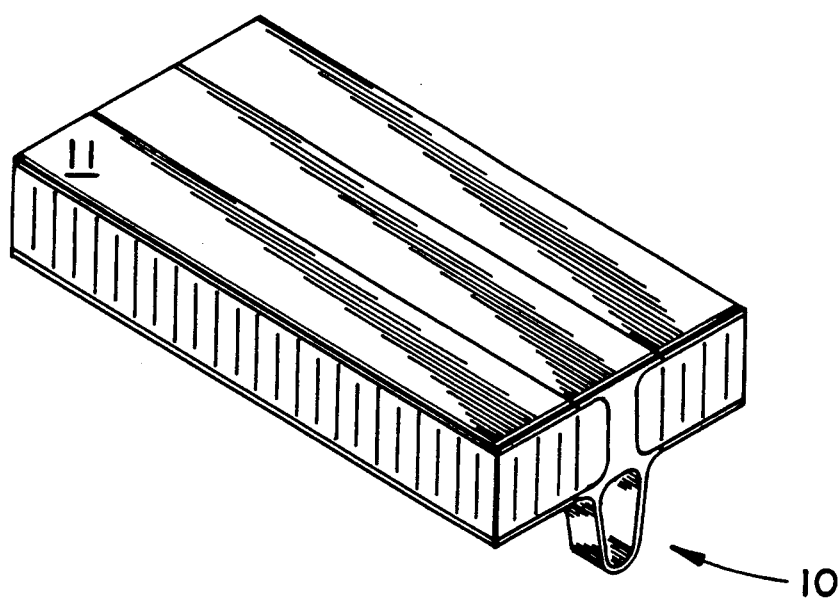
FIG. 1 is perspective view of a hanger loop of the prior art welded to a structural member.
Figure 2:
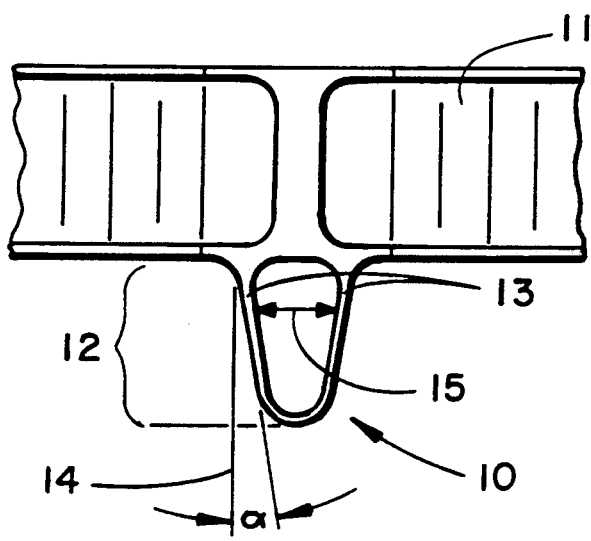
FIG. 2 is an end view of the prior art hanger loop of FIG. 1.

A liner 29 typically has a plurality of attachment tabs 32, aligned in rows, extending therefrom. Each tab 32 has a pin hole 33 adjacent the end thereof, and each of the pin holes 33 within a given row of tabs 32 is aligned, to receive the retaining pin 28. The center-to-center distance between the straps 34 is the same as the center-to-center distance between the tabs 35 within any given row of the liner 29 to allow the tabs 32 of the liner 29 to mesh with the straps 21 of the present invention as shown in FIG. 5. As is clearly evident from a comparison of FIGS. 2 and 4, the cross-sectional area of the hanger strap 21 of the present invention is substantially larger than the hanger loop 10 of the prior art. This larger cross-sectional area significantly reduces the complexity involved in inserting the retaining pin 28 through a plurality of liner tabs and hanger straps.

The rail 22 is relatively flat with upturned bearing edges 36 to provide stiffness to the rail 22. The outer surface 37 of each bearing edge 36 has a radius of curvature at least as great as the radius of the retaining pin 28 to ensure that the maximum stress concentration in each strap does not occur at the bearing edges 36. Additionally the width 38 of the rail 22 and the height 39 of the bearing edges 36 prevent the fastener heads 40 from interfering with the straps 21. Preferably, the fastener hole 41 in each strap 21, through which a fastener 23 extends, is larger than the fastener 23, as shown in FIGS. 4 and 5, to allow for thermal expansion of the fastener 23.

In use the rail 22 is secured by the fasteners 23 to a first component 27 with the straps 21 sandwiched therebetween. Then a second component 29 having a row of tabs 32 as described above is positioned adjacent the rail 22 and straps 21 such that the tabs 32 extend into the spaces 42 between adjacent straps 21. A retaining pin 28 is then inserted through the straps 21 and the pin holes 33 of the tabs 32, securely locking the first component 27 to the second component 29 as shown in FIGS. 4 and 5.

Since the hanger assembly 20 of the present invention is not welded to the structural component 27, the hanger assembly 20 can be easily removed for repair or replacement. Likewise, since the straps 21 are not permanently secured to the rail 22, straps 21 which fail during use can be replaced during normal maintenance and the entire hanger assembly 20 can be reused. Thus, the costs associated with maintaining components which use such hanger assemblies 20 can be significantly reduced.

The design of the present invention allows a wide variety of materials to be used for the straps 21, the rail 22, the fasteners 23, and the retaining pin 28, allowing the optimum materials to be selected without limitation regarding weldability considerations of the materials. The large cross-sectional area of each strap 21 simplifies insertion of the retaining pin 28 when connecting the second component 29 to the hanger assembly 20, and the high degree of maintainability provided by the replaceable straps 21 reduces the maintenance requirements of the present invention. Thus, the hanger assembly 20 of the present invention represents a significant improvement over the hanger loops 10 of the prior art.

Although this invention has shown and described with respect to detailed embodiments thereof, it will be understood by those skilled in the art that various changes in form and detail thereof may be made without departing from the spirit and scope of the claimed invention.

We claim:

1. A hanger assembly for attaching a first component to a second component, the second component having a row of connecting tabs extending therefrom, each tab having a pin hole and each of the pin holes aligned with the other pin holes, said hanger assembly comprising:
   a rail,
   a plurality of hanger straps, each hanger strap encircling and contacting the rail,
   means for fastening the rail to the first component, and,
   means for attaching the straps to the second component.

2. The hanger assembly of claim 1 wherein each of the straps is in spaced relation to adjacent straps and one of the tabs is interposable therebetween.

3. The hanger assembly of claim 2 wherein the fastening means includes a plurality of fasteners, the rail includes a plurality of rail holes, and each fastener extends through one of the rail holes.

4. The hanger assembly of claim 3 wherein each of the straps includes a fastener hole, and one of the fasteners extends through each fastener hole.

5. The hanger assembly of claim 4 wherein each of the straps includes a cutout through which the fastening means is accessible.

6. The hanger assembly of claim 5 wherein the attaching means includes a pin extending through each of the straps and each of the pin holes.

7. The hanger assembly of claim 6 wherein each of the fastener holes is slightly larger than the fastener received therein to provide for thermal expansion of the fastener received therein.

8. The hanger assembly of claim 1 wherein the fasteners are bolts, each bolt extending through the rail, through one of the fastener holes, and into the first component, and a portion of each strap is sandwiched between the rail and the first component.

9. A mechanically attached liner hanger for attaching a thermal liner of a nozzle on a gas turbine engine to a component of the nozzle, said hanger comprising:
   a rail,
   means for mechanically attaching the rail to the component,
   a plurality of hanger straps, each strap encircling the rail and having a hole through which the fastening means extends, each of the straps in spaced relation to adjacent straps, a portion of each strap sandwiched between the rail and the component, and,
   a retaining pin for attaching the straps to the liner,
   wherein the liner has at least one row of connecting tabs extending therefrom, each tab has a pin hole therein, each pin hole is aligned with the other pin holes within the row of tabs, the tabs are interposable between adjacent straps, and the retaining pin extends through each of the straps and each of the pin holes to secure the liner to the liner hanger.

* * * * *